July 25, 1950 R. K. SUPER 2,516,160
BRAKE
Filed July 11, 1946 4 Sheets-Sheet 1

INVENTOR.
Ralph K. Super
BY
Strauch & Hoffman
ATTORNEYS

July 25, 1950 R. K. SUPER 2,516,160
BRAKE
Filed July 11, 1946 4 Sheets-Sheet 2

INVENTOR.
Ralph K. Super
BY
Strauch & Hoffman
ATTORNEYS

July 25, 1950   R. K. SUPER   2,516,160
BRAKE
Filed July 11, 1946   4 Sheets-Sheet 3

Inventor
Ralph K. Super
By Strauch & Hoffman
Attorneys

July 25, 1950 R. K. SUPER 2,516,160
BRAKE
Filed July 11, 1946 4 Sheets-Sheet 4
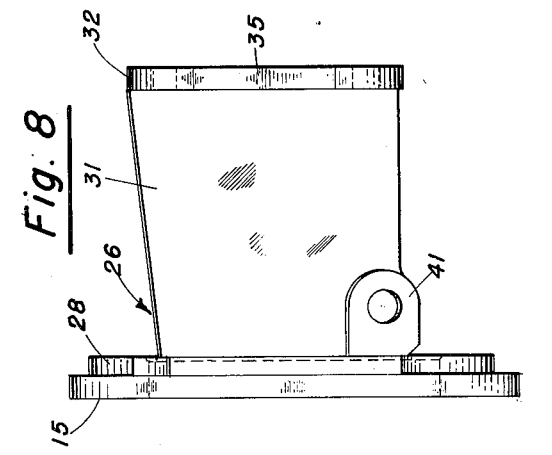
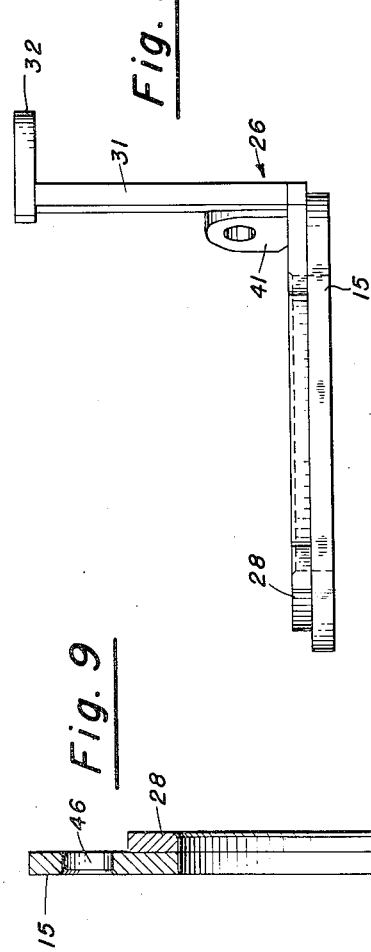
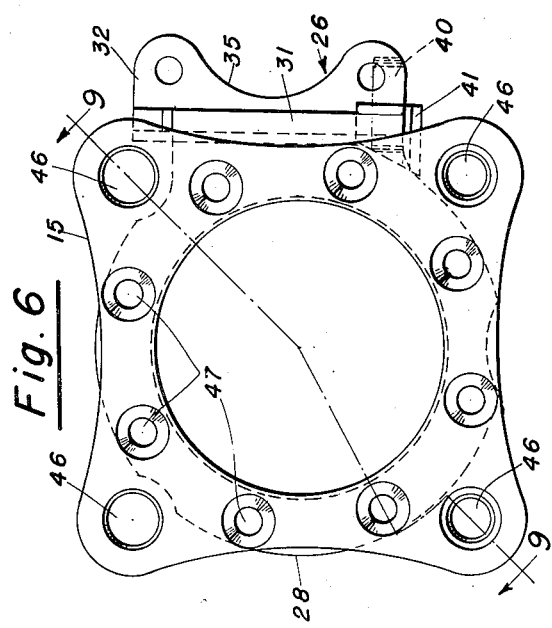
Inventor
Ralph K. Super
By Strauch & Hoffman
Attorneys Patented July 25, 1950

2,516,160

UNITED STATES PATENT OFFICE 2,516,160

BRAKE

Ralph K. Super, Detroit, Mich., assignor to The Timken-Detroit Axle Company, Detroit, Mich., a corporation of Ohio Application July 11, 1946, Serial No. 682,857

16 Claims. (Cl. 188—152)

This invention relates to an improved mounting and arrangement for vehicle brake actuating mechanism and particularly to arrangements by which a fluid brake actuating assembly may be mounted closely adjacent the brake mechanism free from interference with the springs and other vehicle mechanism and undergear.

Prior to the present invention, accepted commercial design in the air brake field has been to mount the actuating diaphragm or cylinder on the axle with its axis normal to the axis of rotation of the brake cam shaft which extended parallel to the axis of rotation of the wheel to be braked. It was necessary to mount the actuator on the axle well toward the longitudinal center line of the vehicle to avoid interference with springs, radius rods, torque rods and other vehicle parts. Hence the cam shaft was relatively long and supported at opposite ends in bearings in the braket by which the actuator was mounted on the axle and in the brake backing plate respectively. This arrangement required special actuator mounting brackets which had to be accurately located to align the cam shaft bearings and the undesirably long cam shaft was difficult to align and maintain in alignment and against bending during assembly and during high braking torque conditions in operation.

The special brackets for mounting the actuator were usually welded or similarly secured to the axle housing at the factory. Much difficulty and inconvenience arose because different manufacturers purchasing the axles have widely different specifications as to spring mounts, torque and radius rod attachments and like parts individual to their particular vehicles, so that a single type of actuator mounting and cam shaft length did not satisfy all requirements. This has led to much extra work and expense in manufacture and the necessity for providing large stocks of the same axle housing with variously mounted actuator brackets and was particularly true with welded brackets which it was necessary to secure to the axle housing before final heat treatment.

It is accordingly a major object of the present invention to provide for an axle assembly a brake mechanism actuator novelly mounted independently of the other axle attachments.

A further object of the invention is to provide a novel mounting for installing brake actuator mechanism on an axle which is capable of use on a number of axles without interfering with spring, radius rod, torque rod and other attachment brackets or seats which may vary in the different axles.

A further object of this invention is to provide an actuating cylinder secured to the brake spider which may be located in a protected position, substantially within the elevation shadow-line of the axle housing, at either the front or rear, or in intermediate positions, by rotating the said brake spider into the desired position before securing the spider to the axle flange.

A further object of this invention is to provide a brake actuating mechanism in a novel unitary assembly with brake mechanism and actuator mounted free of the axle housing, which greatly reduces the number of possible variations of the same axle housing that a manufacturer is forced to keep in stock.

Another object of this invention is to provide a brake wherein field changes will be expedited and hydraulic or other type brakes may be replaced by air brakes without the necessity of welding brackets on previously heat treated axle housings.

A further object of the invention is to provide a novel brake mounting bracket.

A further object of the invention is to provide a novel adapter mounting for a brake actuator designed to permit installation of the actuator in any of a number of positions about and on the axle housing without interference with the other axle attachments.

A further object of this invention is to provide a novel pneumatic brake assembly that may be provided independent of the axle housing.

A still further object of this invention is to provide a novel fluid brake actuator that may be located in a protected position substantially in either the front or rear elevational projection of the axle housing.

A still further object of the invention is to provide a fluid brake actuator with its axis substantially parallel to the longitudinal axis of the axle housing which supports it.

Other objects of the invention will become apparent as the specification proceeds in connection with the appended claims and the annexed drawings wherein:

Figure 6 is an end elevation of the brake spider and bracket in assembly prior to mounting thereon of the brake mechanism and actuator;

Figure 7 is a top plan view of the assembly of Figure 6;

Figure 8 is a side elevation of the assembly of Figure 6; and

Figure 9 is a section substantially along line 9—9 in Figure 6.

My invention will now be described in connection with its preferred embodiment as applied to the mounting of a fluid brake actuating cylinder upon the drive axle housing of a vehicle.

Figure 1:
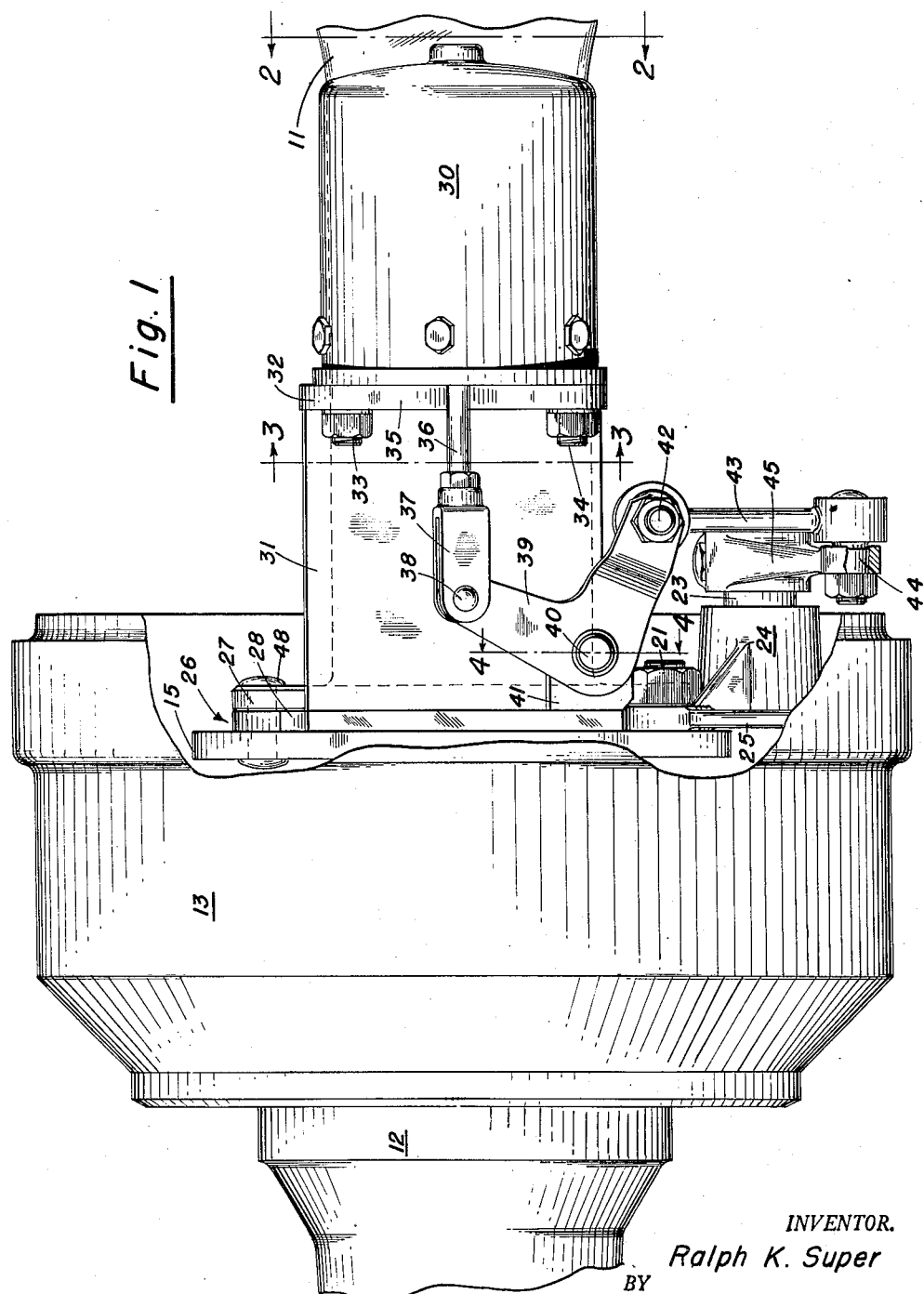
Figure 1 is a front elevation of one end of an axle housing partly broken away to show the brake actuating mechanism and its supporting bracket according to a preferred embodiment of the invention.

Referring to Figure 1, a drive axle housing 11 is supported at opposite ends by rotatable ground engaging wheels, one of which is indicated by its hub 12. A brake drum 13, rigid with hub 12, extends over and houses the brake mechanism to be operated by the actuating cylinder hereinafter to be described. Wheel hub 12 is operatively connected to a suitable driven axle shaft 14 (Figure 2) within the housing 11 as in the usual vehicle axle assembly.

The brake mechanism for the wheel at the illustrated end of housing 11 is entirely supported by a brake spider 15 which is preferably a flat plate centrally apertured to permit passage of the cylindrical end boss of housing 11 beyond flange 27 and disposed normal to the axis of rotation of the wheel. Spider 15 may be substantially square and may have inwardly rounded sides intermediate its corners, as illustrated also in Figure 2, to permit passage of cooling air to the brake mechanism.

Two brake shoe and lever assemblies indicated at 16 and 17 are pivotally mounted at their upper ends on suitable anchor pins indicated at 18 and 19 respectively and are provided with suitable brake shoe fulcrums at their lower ends at anchor pins 21 and 22 respectively. A brake cam shaft 23 is rotatively supported in a boss 24 integral with a bracket 25 supported by spider 15, bracket 25 being secured to the spider at opposite ends by anchor pins 21 and 22 of the brake mechanism.

While it will be appreciated that any suitable brake mechanism may be mounted on spider 15 and operated by shaft 23, I preferably employ the compound brake mechanism disclosed and claimed in the co-pending application of myself and Lawrence R. Buckendale, Ser. No. 569,392, filed December 22, 1944, now United States Letters Patent No. 2,435,955, issued February 17, 1948, wherein brake shoes, rockably and slidably mounted on pivoted levers and fulcrumed on the anchor pins, are actuated by a suitable equalizing mechanism interposed between shaft 23 and corresponding ends of the levers. For further details as to this type of brake mechanism per se, reference is especially directed to this patent.

Brake spider 15 may be a conventional part of the brake mechanism and per se does not constitute the present invention. The present invention is, however, specifically concerned with a novel arrangement by which the actuator for the brake mechanism supported by the brake spider is mounted on the axle housing by the same flange as that which supports the brake spider, as will appear.

In the illustrated embodiment, the actuator is an air brake cylinder mounted on a bracket 26 which is rigidly secured to a radial flange 27 that is secured as by welding to housing 11 and is also secured to brake spider 15.

Figure 2:
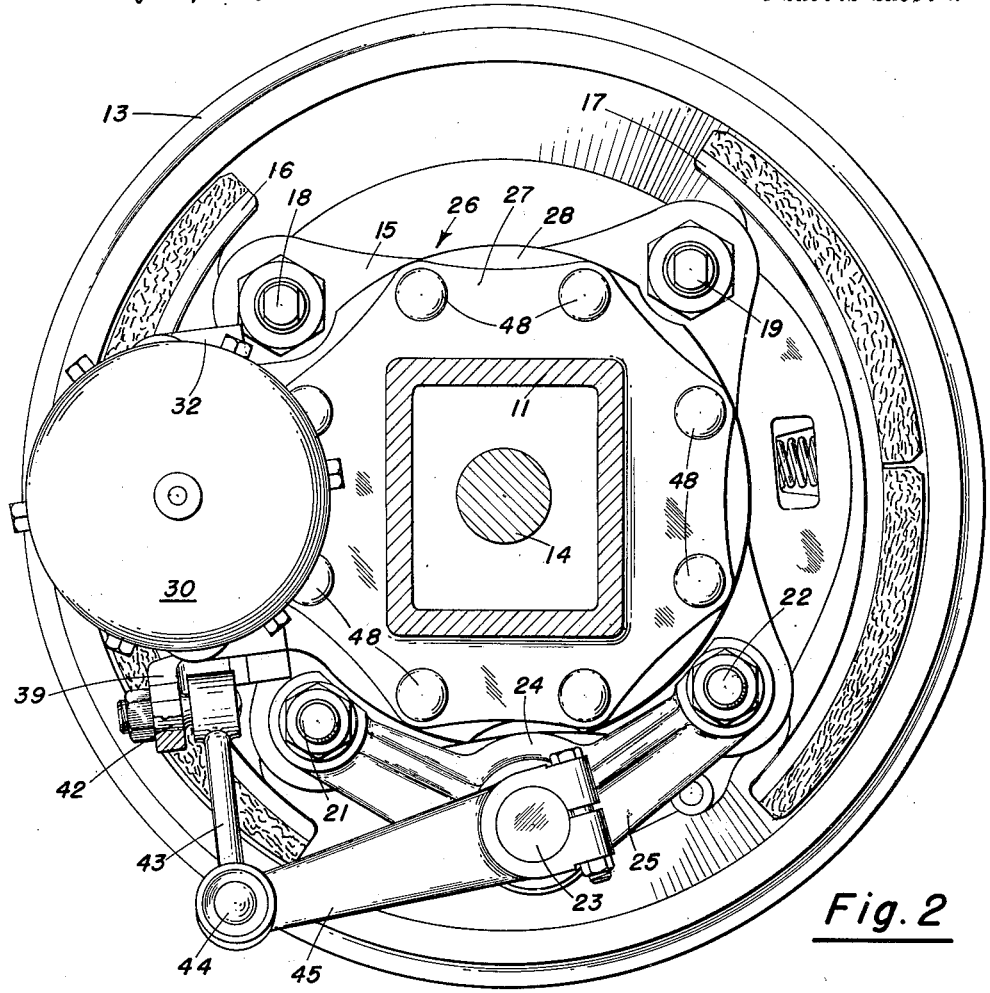
Figure 2 is a section through the axle housing substantially along the line 2—2 of Figure 1 further illustrating the brake and the mechanism for actuating the same.

The bracket for mounting the actuator on the axle housing preferably comprises a flat end plate 28 which may if desired be circular in form substantially as shown in Figure 2. Plate 28 is centrally apertured so as to surround axle housing 11.

Figure 3:
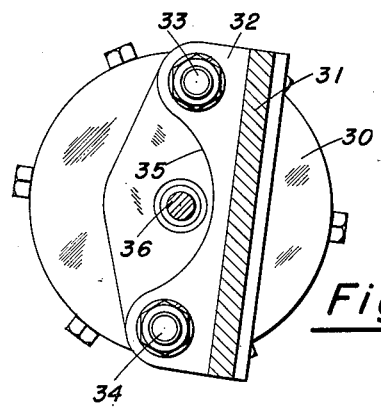
Figure 3 is a sectional view substantially along line 3—3 of Figure 1 illustrating further the mounting bracket for the actuator.
Figure 4:
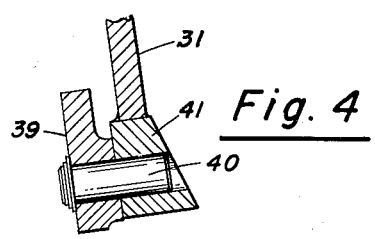
Figure 4 is a fragmentary sectional view substantially along line 4—4 of Figure 1 illustrating the mounting of the bell crank on the bracket.
Figure 5:
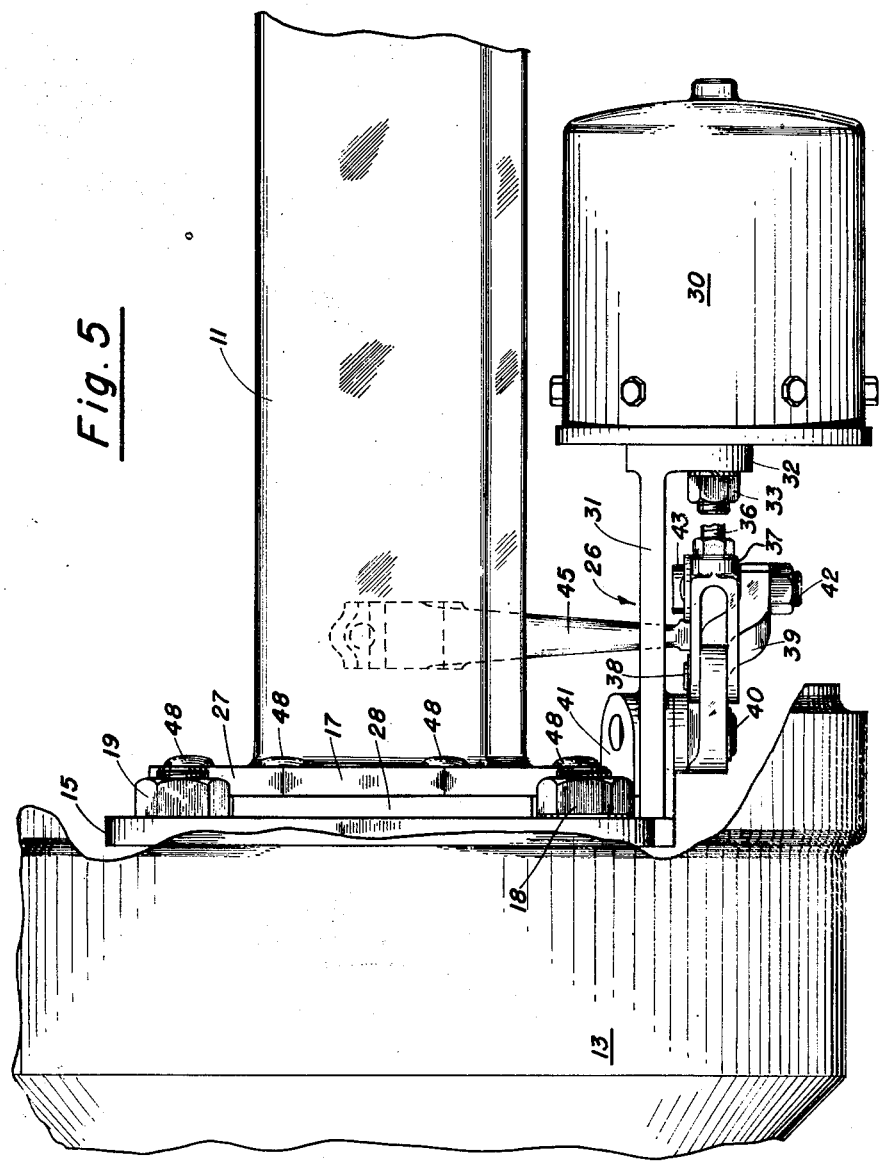
Figure 5 is a top plan view of the assembly of Figure 1.

Bracket 26 comprises, in addition to plate 28 which is parallel to the brake spider, a flat web portion 31 which extends at right angles thereto in spaced relation to the axle housing and which terminates in a flange 32 parallel to plate 28. A pneumatic, preferably air, actuating cylinder 30 of conventional construction is secured to flange 32 as by bolts 33 and 34. As illustrated in Figure 3, flange 32 is recessed at 35 to permit passage of piston rod 36 which is attached at one end to the pneumatically driven element within the actuating cylinder, and at its bifurcated other end 37 is connected by a suitable pivotal connection indicated at 38 to one arm of a bell crank 39 which is pivoted in turn upon a pivot post 40 rigidly secured on a suitable block 41 rigid with bracket 26. The other arm of crank 39 is connected by means of a suitable ball-and-socket connection 42 to one end of a link 43, the other end of which is connected by a suitable ball-and-socket connection 44 to the end of a lever 45, rigidly and non-rotatably secured to brake cam shaft 23.

Preferably spider 15, prior to mounting thereon of the brake mechanism, is rigidly secured as by welding to plate 28 of bracket 26 with their central apertures registered, to provide the permanent sub-assembly illustrated in Figures 6–9. Then spider 15 is usually formed with anchor pin holes 46 at its corners, and a circular row of rivet receiving holes 47 is formed through spider 15 and plate 28. Rivet holes 47 correspond in number, size and location to a corresponding circular series of rivet holes in housing flange 27, so that the brake spider and bracket assembly may speedily and easily be mounted rigidly on the axle housing by passing it over the boss end of the axle housing into contact with flange 27 and then rigidly securing the parts together as by rivets 48.

In practice the air cylinder 30 and its attached associated motion transmitting linkage consisting of piston rod 36, crank 39, link 43 and lever 45 are installed upon bracket 26 after assembling the spider and bracket assembly of Figures 6–9 with the axle housing. If desired, the brake mechanism can be mounted on spider 15 after that assembly is secured to the axle, and lever 45 attached to cam shaft 23 when the latter is thrust through boss 24.

A considerable advantage of this manner of mounting the air cylinder is that it does not require welding in the final mounting on the axle so that the installation may be done away from the factory. This is particularly valuable where air brakes are being substituted for hydraulic or mechanical brakes. The entire spider and bracket assembly may, during installation, be rotated about housing 11 to a large number of positions of registry of the rivet holes to find a suitable position where the air cylinder does not interfere with the springs and spring seats, radius and torque rod attachment brackets and other axle housing attachments, so that the assembly is universal to a large number of final axle structures. Preferably the air cylinder is located in the elevational projection, or elevation shadow-line, front or rear, of the axle housing for maximum protection against damage from external objects.

In the installation the piston rod 36 reciprocates parallel to the axis of rotation of cam shaft 23 and the motion transmitting mechanism between them is constructed and arranged to convert this reciprocation of rod 36 into corresponding rotation of cam shaft 23 for application or retraction of the brake shoes to drum 13.

Since the brake actuator and its motion transmitting linkage are all mounted on bracket 26 and the bracket is permanently rigid with adjacent spider 15 with which the boss 24 for journaling cam shaft 23 is rigid, the necessity for providing a long cam shaft or an outer set of cam shaft bearings is rendered unnecessary. The whole assembly is inexpensive and simple to install and is efficient and reliable in operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an axle assembly wherein a wheel brake mechanism having a rotatable operating shaft is mounted on a non-rotatable part of said axle, a fluid motor, an external flange on said non-rotatable axle part, motion transmitting mechanism interconnecting said motor and shaft so that actuation of said motor rotates said shaft to control said brake mechanism, and means mounting said motor on said non-rotatable axle part with its axis substantially parallel to the axis of said axle comprising a common mounting bracket for said brake mechanism and motor attached to said flange and having an angularly related motor support portion extending along said non-rotatable axle part away from said brake mechanism.

2. In an axle assembly, a non-rotatable axle part having an external flange, a brake mechanism spider secured to said flange, a brake motor support bracket directly secured to said flange adjacent said spider, and motion transmitting means operatively mounted on said bracket interconnecting said motor and the brake mechanism on said spider.

3. In an axle assembly, a non-rotatable axle housing having an external flange, and a brake motor support bracket secured to said flange, an angularly disposed web on said bracket extending along the side of said housing closely adjacent thereto, and a brake motor mounting flange on the end of said bracket spaced from said axle housing flange.

4. In an axle assembly, a non-rotatable axle part having a peripheral flange provided with a series of fastener receiving openings, and a brake motor mounting bracket extending along said axle part and having a projection recessed to fit over said axle part, said projection being formed with a series of fastener receiving openings corresponding to said openings on said flange whereby during assembly said bracket may be moved about the periphery of said axle part until clear of other devices attached to the axle and then secured to the axle by inserting fastener elements through said openings.

5. In a brake assembly, a non-rotatable axle part, a brake spider, a relatively short brake shoe actuating shaft journaled on said spider and projecting therefrom, a brake actuating motor, a bracket attached to said non-rotatable axle part, means mounting said spider and said motor in spaced relation on said bracket, and motion transmitting linkage intermediately pivoted on said bracket interconnecting said motor and said shaft.

6. In the brake assembly defined in claim 5, said bracket extending along said axle part away from said spider, and said motor having a reciprocable driven member substantially parallel to said shaft connected to said linkage.

7. In an axle assembly having a non-rotatable axle part, a bracket attached to said part near one end thereof and extending therealong, a brake spider carrying brake shoes and associated operating mechanism, a brake motor having a driven member reciprocable substantially parallel to said axle part, means mounting said motor and spider in spaced relation on said bracket, and motion transmitting linkage between said motor and brake mechanism comprising a crank connected to said reciprocable member and pivoted on said bracket and levers connecting said crank with said brake mechanism.

8. In an axle assembly, a ground engaging wheel supported, non-rotatable axle part, a brake drum on said wheel, an external flange on said axle part adjacent said drum, brake mechanism comprising a plurality of brake shoes disposed within said drum and associated shoe operating means having a rotatable shaft substantially parallel to the axis of said axle, a brake spider on which said brake mechanism is mounted, a brake actuating motor disposed with its axis substantially parallel to the axis of said axle, motion transmitting linkage interconnecting said motor and said shaft, a bracket attached to said flange and projecting away from said brake drum, means mounting said brake spider and said motor in spaced relation on said bracket, and a pivot support for said linkage on said bracket.

9. A brake mechanism actuator support bracket comprising an end plate for attachment to a non-rotatable axle part, a web extending substantially normal to said plate, an actuator mounting flange on the other end of said web, and a pivot post projecting from said web adjacent said plate.

10. In a vehicle brake assembly, a brake mechanism support, a rotatable brake shoe operating shaft projecting therefrom, a brake actuating motor mounted in axially spaced relation to said support and having a reciprocable driven member terminating short of said support and extending oppositely and substantially parallel to said shaft, a crank pivoted about an axis transversely of said shaft and pivoted at one end to said member, a lever rigid with the projecting end of said shaft, and a link universally connected at opposite ends to said lever and the other end of said crank.

11. In a vehicle brake subassembly, a spider apertured to encompass an axle and brake shoes pivotally mounted on the spider on one side thereof, a brake shoe operating cam having a rotatable cam shaft projecting from the other side of said spider, a motor having a power element reciprocable substantially parallel to said shaft, a motor mounting bracket secured to said spider and projecting therefrom in the same direction as said shaft, and motion transmitting means mounted on said bracket interconnecting said element and the projecting end of said shaft.

12. In a brake assembly for a non-rotatable axle part provided with a radial flange, a bracket comprising a plate, a flange projecting substantially normal to one end of said plate apertured to surround said non-rotatable axle part and formed with a series of openings to receive fastening elements for attachment to said axle flange, and a motor mounting flange projecting from the other end of said plate in the opposite direction from said first flange.

13. In an axle assembly, a non-rotatable axle member, a radial flange rigid with said axle member, a brake spider secured to said flange and having brake shoes mounted on one side and a rotatable operating shaft projecting from the other side, a bracket secured to said flange and projecting away from said spider closely alongside said axle member, a motor and means mounting said motor on said bracket in spaced relation to said spider, a reciprocable power element projecting from said motor toward said spider, and motion transmitting linkage carried by said bracket interconnecting the shaft and said power element.

14. In an axle assembly wherein a non-rotatable axle member has wheel brake mechanism mounted thereon, a relatively short brake mechanism operating shaft supported for rotation about an axis generally parallel to the axle, a motor support rigidly connected to said axle member and extending closely alongside said axle member adjacent said brake mechanism, a flange on said support projecting away from said axle member, a motor mounted on said flange near said brake mechanism and having a reciprocable power element extending oppositely to said shaft, and motion transmitting linkage interconnecting said element and the inner end of said shaft.

15. In a brake assembly, a brake spider, a non-rotatable axle member on which said spider is mounted, a relatively short brake shoe actuating shaft journaled on said spider and projecting therefrom, a brake actuating motor, a bracket attached to said axle member, means mounting said motor on said bracket in spaced relation to the spider, and motion transmitting linkages intermediately pivoted on said bracket interconnecting said motor and said shaft.

16. In a brake for a motor vehicle axle, a brake drum, a non-rotatable axle member, brake mechanism disposed within said drum and mounted on said axle member, a rotatable brake mechanism operating shaft projecting externally with respect to said drum, a motor mounted on said axle member exteriorly of said drum and comprising a motor housing and a reciprocable power element, and motion transmitting means interconnecting said shaft and said element, said motor being disposed with the axis of said reciprocable power element lying in a plane substantially normal to a radial plane passing through the axis of said drum and said motor housing.

RALPH K. SUPER.

REFERENCES CITED

The following references are of record in the file of this patent:

UNITED STATES PATENTS

| Number | Name | Date |
|---|---|---|
| 1,310,295 | Robillard | July 15, 1919 |
| 1,433,132 | Hart | Oct. 24, 1922 |
| 1,499,807 | Dewey | July 1, 1924 |
| 1,509,934 | Craig | Sept. 30, 1924 |
| 1,514,689 | Down | Nov. 11, 1924 |
| 1,575,712 | Ohl | Mar. 9, 1926 |
| 1,944,921 | Christensen | Jan. 30, 1934 |
| 2,162,775 | Dick | June 20, 1939 |
| 2,331,652 | Buckendale | Oct. 12, 1943 |
| 2,409,908 | Simpkins | Oct. 22, 1946 |